US006126887A

United States Patent [19]

Ward et al.

[11] Patent Number: 6,126,887

[45] Date of Patent: Oct. 3, 2000

[54] METHOD OF MANUFACTURE OF CERAMIC ARC TUBES

[75] Inventors: Lisa Mason Ward, Cleveland; Curtis E. Scott, Mentor; J. Robert Woodward, Chagrin Falls, all of Ohio

[73] Assignee: General Electric Company, Schenectady, N.Y.

[21] Appl. No.: 09/364,435

[22] Filed: Jul. 30, 1999

[51] Int. Cl.[7] .................... C04B 33/32

[52] U.S. Cl. .................... 264/608; 264/607; 264/671; 264/672; 264/673; 264/605

[58] Field of Search .................... 264/605, 607, 264/608, 671, 673, 672

[56] References Cited

U.S. PATENT DOCUMENTS

| | | | |
|---|---|---|---|
| 1,513,617 | 10/1924 | Litt | 264/605 |
| 3,499,634 | 3/1970 | Rea | 264/607 |
| 4,285,732 | 8/1981 | Charles et al. . | |
| 4,704,093 | 11/1987 | Morris . | |
| 5,064,588 | 11/1991 | Misawa | 264/671 |
| 5,514,313 | 5/1996 | Yoshida | 264/671 |
| 5,725,827 | 3/1998 | Rhodes et al. . | |
| 6,013,224 | 1/2000 | Hattori | 264/671 |

FOREIGN PATENT DOCUMENTS

| | | | |
|---|---|---|---|
| 0 587 238 A1 | 9/1993 | European Pat. Off. . | |
| 40528310 | 10/1993 | Japan | 264/671 |

*Primary Examiner*—James Derrington

*Attorney, Agent, or Firm*—Fay, Sharpe, Fagan, Minnich & McKee, LLP

[57] ABSTRACT

A method of manufacturing a ceramic arc chamber (420) comprising providing a sintering tray (412) including a plurality of bores (422). The bores (422) having a first diameter upper section (424) and a second narrower diameter lower section (426). Positioning a plurality of ceramic end caps (212) having a main body portion (216), and a leg portion (219) in the bores (422) such that the leg portion (219) passes downwardly through the narrower diameter lower section (426) and the main body portion (216) is retained within the upper section (424). Moreover, the second diameter lower section (426) acts as a shoulder supporting the end cap (210). Next, a ceramic arc tube (214) is positioned within the first diameter upper section (424) and mated with the ceramic end cap (212). A second end cap (210) is mated to a second upper open end of the ceramic arc tube (214) to form an arc tube preform (420). The arc tube preforms (420) are then sintered to join the components via controlled shrinkage.

16 Claims, 5 Drawing Sheets

100
101
102
104
106
107
109
110
112
114
115
116
117
118
119
210
212
214
216
218
219
220
A

METHOD OF MANUFACTURE OF CERAMIC ARC TUBES

BACKGROUND OF THE INVENTION

The present invention relates generally to lighting, and more specifically, to a ceramic arc chamber for a discharge lamp, such as a ceramic metal halide lamp. This invention relates particularly to a method of manufacturing ceramic arc chambers, and more particularly, to a method for sintering ceramic arc chambers.

Discharge lamps produce light by ionizing a fill such as a mixture of metal halides and mercury with an electric arc passing between two electrodes. The electrodes and the fill are sealed within a translucent or transparent discharge chamber which maintains the pressure of the energized fill material and allows the emitted light to pass through it. The fill, also known as a"dose" emits a desired spectral energy distribution in response to being excited by the electric arc.

Initially, the discharge chamber in a discharge lamp was formed from a vitreous material such as fused quartz, which was shaped into a desired chamber geometry after being heated to a softened state. Fused quartz, however, has certain disadvantages which arise from its reactive properties at high operating temperatures. For example, at temperatures greater than about 950 to 1,000□C., the halide fill reacts with the glass to produce silicates and silicon halide, reducing the fill constituents. Elevated temperatures also cause sodium to permeate through the quartz wall. These fill depletions cause color shift over time, which reduces the useful life of the lamp.

Ceramic discharge chambers were developed to operate at high temperatures for improved color temperatures, color renderings, luminous efficacies, while significantly reducing reactions with the fill material. U.S. Pat. Nos. 4,285,732 and 5,725,827, for example, disclose translucent polycrystalline sintered bodies where visible wavelength radiation is sufficiently able to pass through to make the body useful for use as an arc tube.

Typically, ceramic discharge chambers are constructed from a number of parts extruded or die pressed from a ceramic powder and then sintered together. For example, referring now to European Patent Application No. 0587238, five ceramic parts are used to construct the discharge chamber of a metal halide lamp. Two end plugs with a central bore are fabricated by die pressing a mixture of a ceramic powder and inorganic binder. A central cylinder and the two legs are produced by extruding a ceramic powder/binder mixture through a die. After forming the part, it is typically air sintered between 900–1400° to remove organic processing aids. Assembly of the discharge chamber requires tacking of the legs to the cylinder plugs, and the end plugs into the end of the central cylinder. This assembly is then sintered to form joins which are bonded by controlled shrinkage of the individual parts.

In alternative structures, two and three component lamps have been developed and include end pieces of tubes/end caps and a central body. Typically, to facilitate the appropriate binding and mating of these components, the components are glued into an assembled position ("pretacking") and horizontally aligned within a molybdenum sintering tube. This method of sintering, however, has certain disadvantages in that very precise processing is required so that during the compaction of the arc tube body, the end caps are adequately drawn into the chamber body to form an appropriate seal. In this regard, more often than is desirable, the end cap fails to sit flush against the end of the arc chamber tube. In some cases, the end cap may be totally disengaged from the tube during sintering.

BRIEF SUMMARY OF THE INVENTION

An exemplary embodiment of the inventive ceramic arc chamber sintering process includes the steps of forming a ceramic preform arc tube and at least one ceramic preform end cap. The preform arc tube is positioned within a recess in a sintering fixture such that its longitudinal axis is in a substantially vertical orientation. The ceramic preform end cap is then positioned in a mated relationship with an open top end of the ceramic preform arc tube and the combined parts are sintered to form a sealed arc tube via controlled shrinkage. The sintering fixture may be comprised of a refractory metal plate including a plurality of recesses sized to accommodate the ceramic preform arc tube. The recesses may include an upper first diameter portion which retains the body portion of the arc tube and a lower narrower diameter second portion which allows a leg portion of the end cap to extend downwardly. In this manner, a first end cap can be positioned in the recess, the arc tube body mated therewith, and a second end cap mated with the top open end of the ceramic arc tube.

Advantageously, a plurality of sintering fixtures can be combined in a stacked arrangement increasing the production capacity of the inventive sintering method. The inventive method, advantageously relying on gravity, has been demonstrated to reduce defects, particularly those associated with misalignment of the end caps. Furthermore, the inventive process has been shown to reduce manufacturing times, primarily as a result of the elimination of a pretacking step.

DETAILED DESCRIPTION OF THE INVENTION

Figure 1:
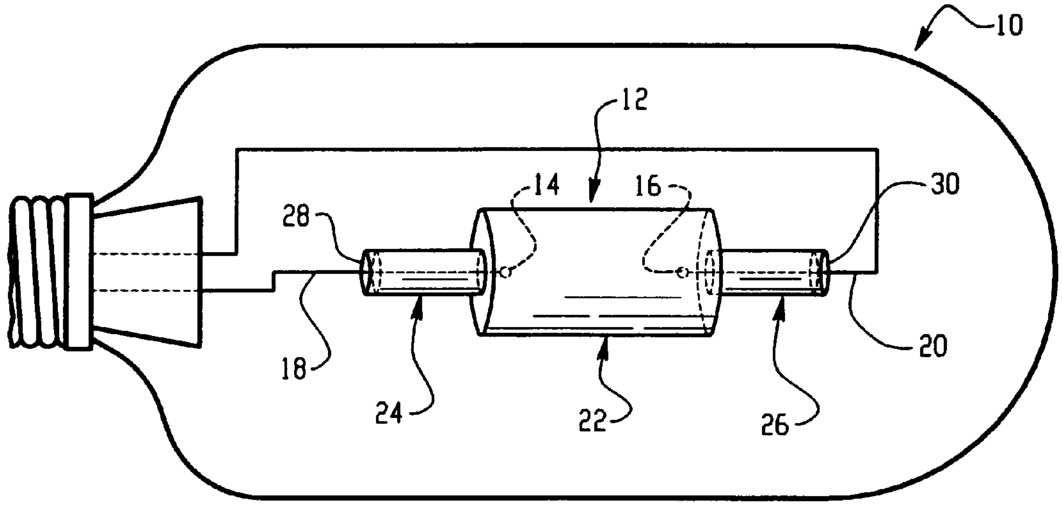
FIG. 1 illustrates a light source including a ceramic discharge chamber according to an exemplary embodiment of the invention.

Referring now to FIG. 1, a discharge lamp 10 according to an exemplary embodiment of the invention is depicted. The discharge lamp 10 includes a discharge chamber 12 which houses two electrodes 14, 16 and a fill (not shown). The electrodes 14, 16 are connected to conductors 18, 20 which apply a potential difference across the electrodes. In operation, the electrodes 14, 16 produce an arc which ionizes the fill in discharge chamber 12. The emission characteristics of the light produced by the plasma depend primarily on the constituents of the fill material, the voltage across the electrodes, the temperature distribution of the chamber, the pressure in the chamber, and the geometry of the chamber. For a ceramic metal halide lamp, the fill material typically comprises a mixture of mercury, a rare gas such as argon or xenon and a metal halide such as NaI, $ThI_3$ or $DyI_3$. For a high pressure sodium lamp, the fill material typically comprises sodium, a rare gas, and mercury. Of course, other examples of fills are well known in the art.

As shown in FIG. 1, the discharge chamber 12 comprises a central body portion 22 and two leg portions 24, 26. The ends of the electrodes 14, 16 are typically located near the opposite ends of the body portion 22 . The electrodes are connected to a power supply by the conductors 18, 20, which are disposed within a central bore of each leg portion 24, 26. The electrodes typically comprise tungsten. The conductors typically comprise molybdenum and niobium, the latter having a thermal expansion coefficient close to that of the ceramic (usually alumina) used to construct the discharge chamber to reduce thermally induced stresses on the leg portions 24, 26.

The discharge chamber 12 sealed at the ends of the leg portion 24, 26, with seal members 28, 30. Seal members 28, 30 typically comprise a disposium-alumina silica glass and can be formed as a glass frit in the shape of a ring around one of the conductors, e.g., 18, aligned vertically with the discharge chamber 12, and melted to flow down into the leg 24 and form a seal between the conductor 18 and the leg 24. The discharge chamber is then turned upside down to seal the other leg 26 after being filled with the dose.

Figures 2A, 2B, 3A, 3B, 3C:
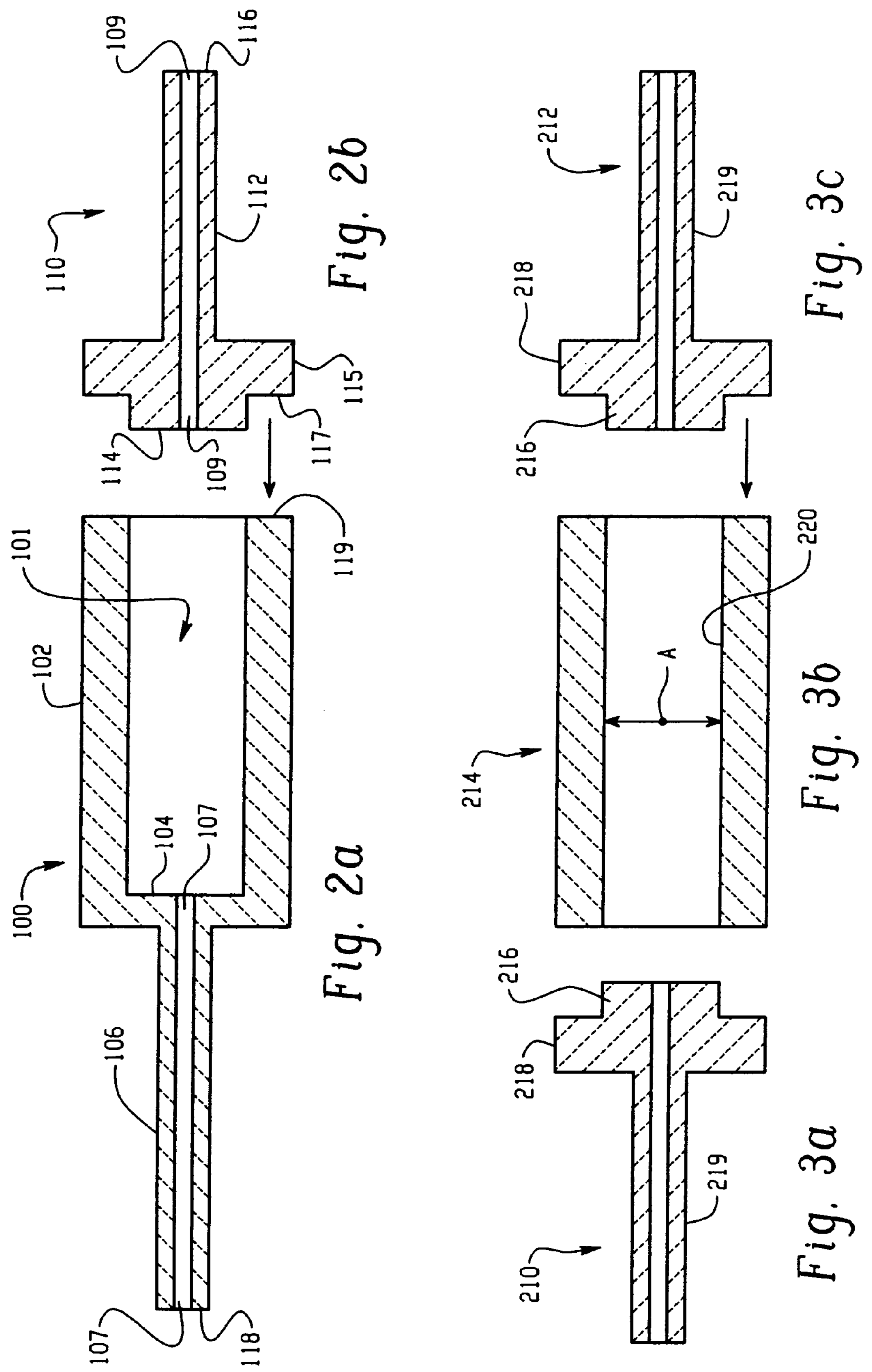
FIGS. 2*a*–2*b* illustrate an exemplary embodiment of a ceramic preform suitable for use in the inventive process.

FIGS. 2*a* through 2*b* illustrate two components of a discharge chamber suitable for assembly via the present inventive process. In FIG. 3*a*, a body member 100 is depicted which includes a body portion 102, a transition portion 104, and a leg portion 106. The transition portion 104 connects the relatively narrow leg portion 106 to the wider body portion 102, and may be generally in the shape of a disk. Leg portion 106 and the transition portion 104 both include a central bore 107 which houses an electrode and a conductor (not shown). The body portion 102 defines a chamber in which electrodes produce a light-emitting plasma.

In FIG. 2*b*, the end cap member 110 is depicted which includes a leg portion 112 and a transition portion 114. Both the leg portion 112 and the transition portion 114 include a central bore 109 which houses a second electrode and the conductor. The transition portion 114 may be generally in the form of a plug which fits inside the end of the body member 100. Transition portion 114 typically has a circumference which is greater than the circumference of the leg portion 112. The transition portion 114 typically includes a radially directed flange 115 which projects outwardly from the transition portion 114. The radially directed flange 115 provides a shoulder 117 which rests against the end 119 of the body member 100 during assembly to fix relative axial position of the end cap member 110 with respect to the body member 100. "Axial" refers to an axis through the central bores 107, 109 of leg portions 106 and 112.

Referring again to FIGS. 2*a* and 2*b*, the body member 100 and end cap member 110 are each preferably formed as a single piece of a ceramic material such as alumina. The body member 100 and the end cap member 110 can be constructed by die pressing a mixture of ceramic powder and a binder into a solid cylinder. Typically, the mixture comprises 95 to 98% by weight ceramic powder and 2–5% by weight organic binder. The ceramic powder may comprise alumina, $Al_2O_3$ (having a purity of at least 99.98%) in a surface area of about 2–10 meters$^2$ per gram. The alumina powder may be doped with magnesia to inhibit grain growth, for example, an amount equal to 0.03% to 0.2%, preferably 0.05% by weight of the alumina. Other ceramic materials which may be used include nonreactive refractory oxides and oxynitrides such as yttrium oxide, hafnium oxide and solid solutions and components with alumina such as yttrium, aluminum, garnet, aluminum oxynitride and aluminum nitride. Binders which may be used individually or in combination of inorganic polymers such as polyols, polyvinyl alcohol, vinylacetates, acrylates, cellulosics and polyethers. Subsequent to die pressing, the binder is removed from the green part typically by a thermal-treatment, to form an bisque fired part. Thermal-treatment may be conducted, for example, by heating the green part in air from room temperature to a maximum temperature from about 980°–1,100° C. over 4 to 8 hours, then holding the maximum temperature for 1 to 5 hours, and then cooling the part. After thermal-treatment, the porosity of the bisque-fired part is typically about 40–50%. The bisque-fired part is then machined, for example, a small bore may be drilled along the axis of the solid cylinder which provides bore 107 in leg portion 106. Next a larger diameter bore may be drilled along a portion of the axis to form chamber 101. Finally, the outer portion of the originally solid cylinder may be machined away along part of the axis, for example, with a lathe, to form the outer surface of the leg portion 106. The end cap member 110 may be formed in a similar manner by first drilling a small bore which provides the bore 109 through the leg portion 112, machining the outer portion of the original solid cylinder to produce a leg portion 112, machining the transition portion 114, leaving the readily directed flange 115.

Alternatively, the component parts of the discharge chamber can be formed by injection molding a mixture comprising about 45 to 60% by volume ceramic material and about 40 to 55% by volume binder. The ceramic material can comprise alumina powder having a surface area of about 1.5 to about 10 meters$^2$ per gram. According to one embodiment, the alumina powder has a purity of at least 99.98%. Alumina powder may be dealt with magnesia to inhibit grain growth, for example an amount equal to 0.03% to 0.2%, preferably 0.05% by weight of the alumina. The minor may comprise a wax mixture or a polymer mixture. Accordingly, subsequent to injection molding, the binder is removed from the molded part, typically by thermal treatment, to form a debinder part. Thermal treatment may be conducted by heating the molded part in air or a controlled environment, e.g. vacuum, nitrogen, inert gas, to a maximum temperature, and then holding the maximum temperature. For example, the lo temperature may be slowly increased by about 30° C. per hour from room temperature to about 160° C. Next, the temperature is increased by about 100° C. per hour to a maximum temperature of 900 to 1,000° C. Finally, the temperature is held at 900 to 1,000° C. for about 1 to 5 hours. The part is subsequently cooled.

FIGS. 3*a*–3*c* illustrate components of a discharge chamber formed from three components. The end cap members 210, 212 are substantially the same as the leg member 110 of FIG. 2*b*. However, in FIG. 3*b*, a body member 214 is substantially cylindrical. The body member 214 can be formed by injection molding or by die pressing. The body member 214 can also be formed conventionally by extrusion. Cap members 210, 212 include a main body portion 216 having a collar 218 and a leg 219. The main body 216 and collar 218 are configured such that the outside surface of the main body 216 fits within to the inside surface of the body member 214 recess 220. For example, diameter A of the recess 220 can be about 6.5 mm, 8.5 mm, 11.5 mm which corresponds to the inner diameters for the cylindrical portion of 35, 70 or 150 watt lamps respectively. The selected material for construction would be tailored such that appropriate shrinkage of the cap members 210, 212 and arc tube body 214 occurs to form a properly sealed join between the arc tube body 214 and the end cap member 210, 212.

Figure 4:
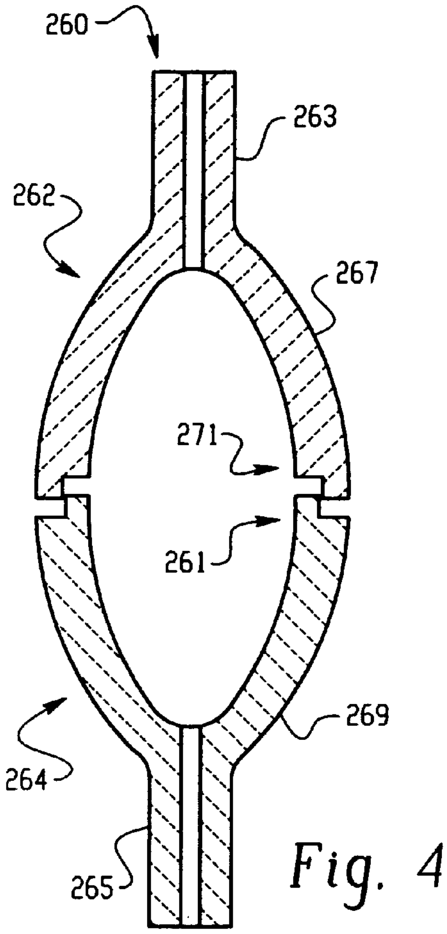
FIGS. 3*a*–3*c* FIG. 4, FIG. 5, FIG. 6, and FIG. 7 represent alternative embodiments of ceramic preform components suitable for sintering according to the present invention.

FIG. 4 illustrates an alternative embodiment suitable to the present invention wherein discharge tube 260 includes a first body member 262 and second body member 264. The first and second members are substantially the same shape with the exception of step regions 261, 271. The step regions of the first and second members 262, 264 are complimentary, so that the first and second members 262, 264 fit together. As with all embodiments of the invention, the controlled shrinkage of the components during sintering will form the necessary sealing of the unit.

Figure 5:
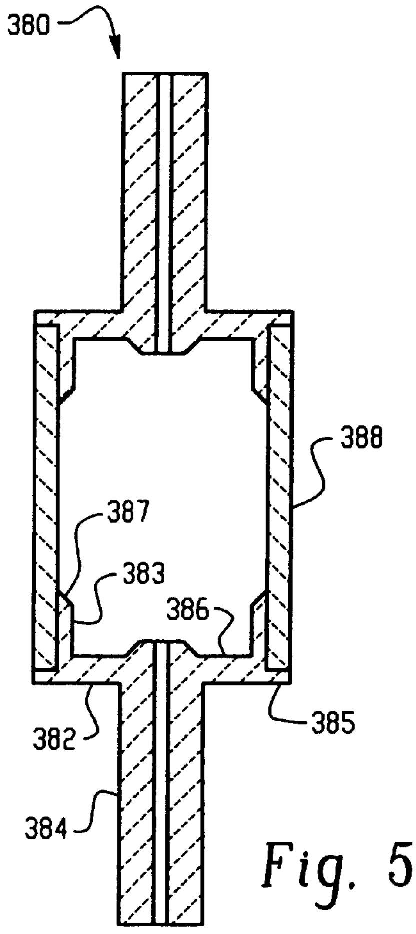

FIG. 5 illustrates end cap member 380 including a leg portion 384 and transition portion 382 with an annular recess 386 and transition portion 382. The end cap member 380 is secured into the cylindrical body 388 by means of a cylindrical wall 383, the end cap member being accurately located on the body portion of the axial direction by means of a flange 385 on the transition portion 382. The upper edge of the wall 383 is an upward taper 387 with the highest outer edge in contact with the inside of the body portion, so as to discourage any of the dose settling on the junction between the wall 383 and body portion.

Figure 6:
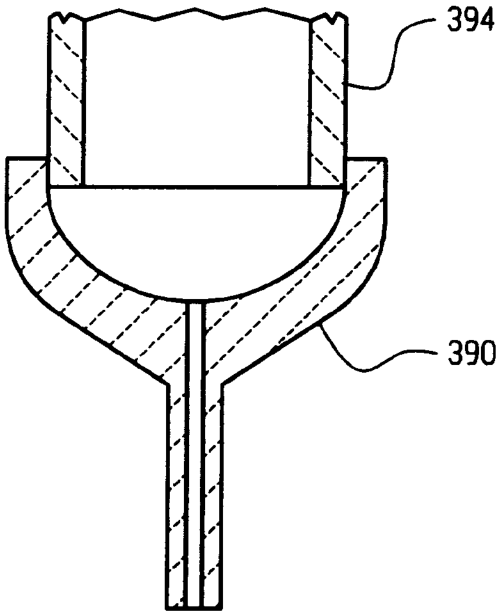
Figure 7:
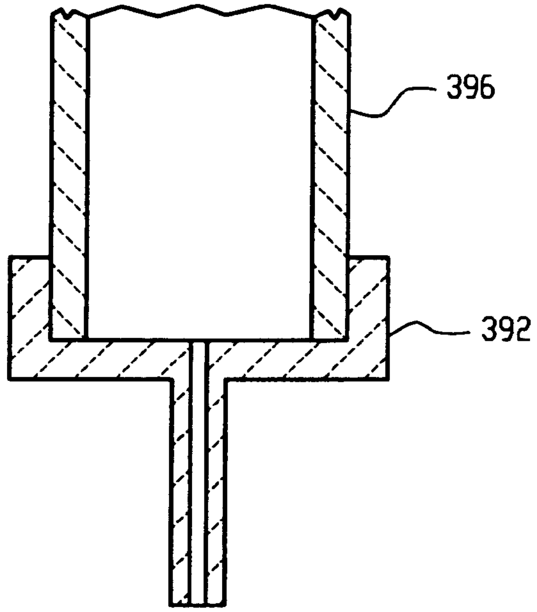

Additional constructions of the lamp components suitable for manufacture/sintering according to the present inventive process are described with reference to FIGS. 6 and 7. In each design, end cap members 390 and 392, respectively, overlap the arc tube body 394, 396. Of course, the inventive process is suitable to use with any shape or combination of components wherein controlled shrinkage of the parts during sintering results in proper sealing of an arc chamber.

Figure 8:
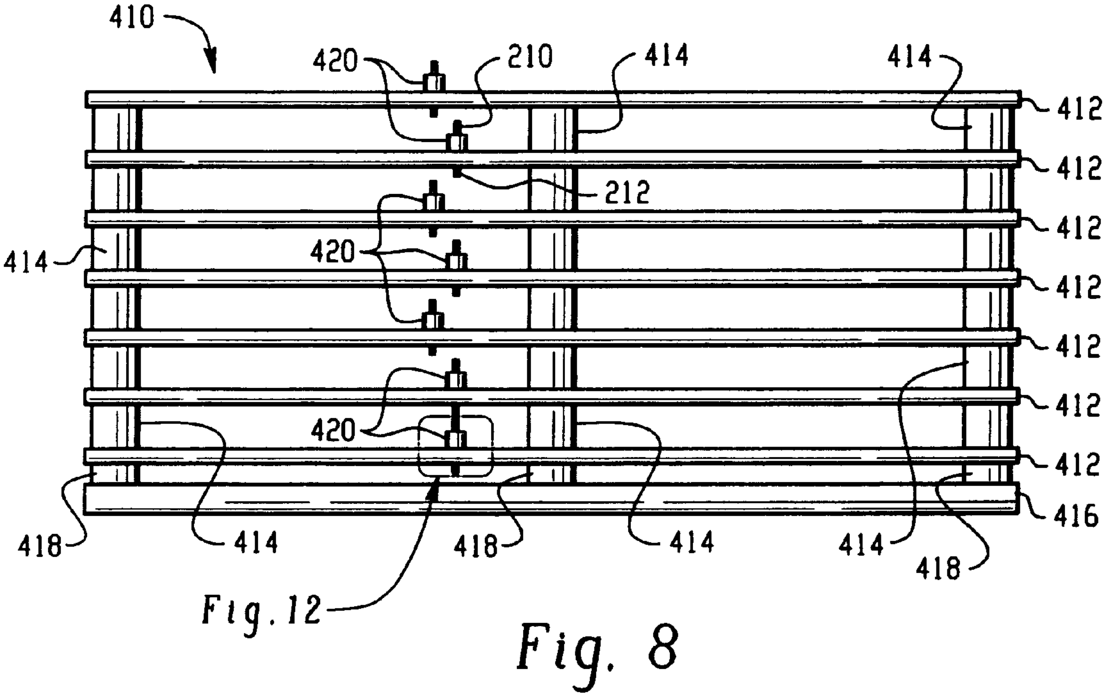
FIG. 8 represents a side elevation view of the inventive sintering fixture.
Figure 9:
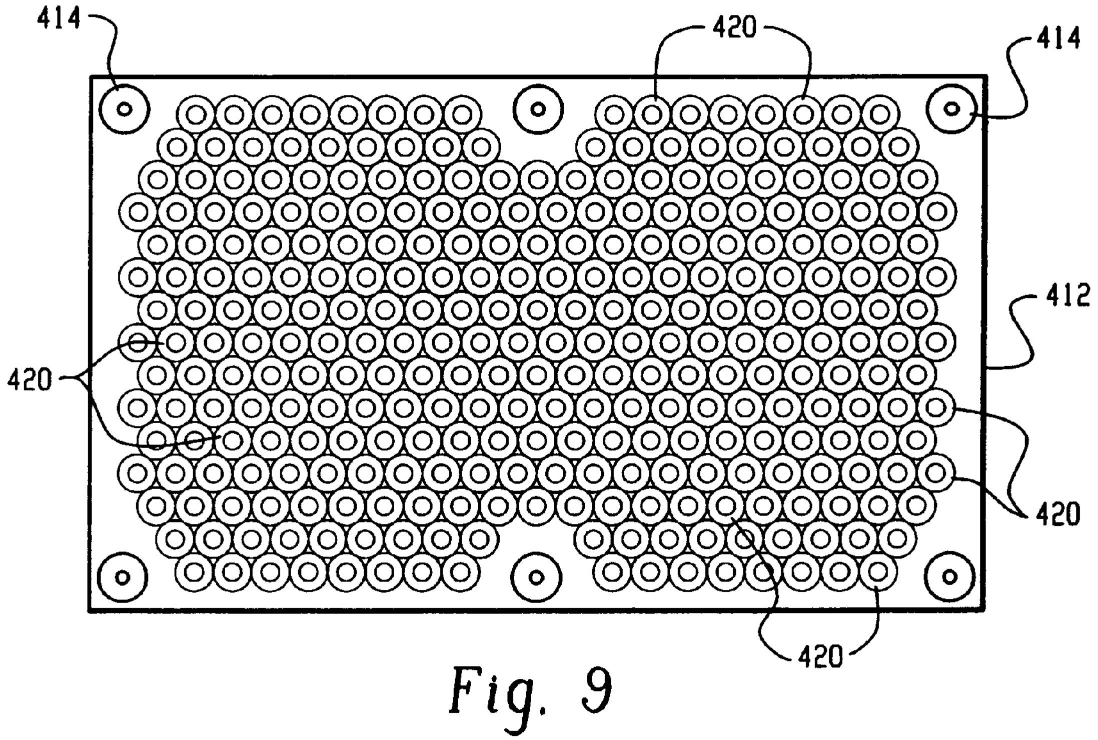
FIG. 9 represents a top plan view of a loaded inventive sintering tray.

Referring now to FIG. 8, a stacked arrangement of the inventive sintering fixture 410 is depicted. Particularly, eight sintering trays 412 are stacked using a plurality of spacer elements 414. The sintering trays 412 rest atop a base plate 416 and are supported thereabove via slightly shorter in length spacer elements 418. Although only a single assembled arc discharge chamber 420 is shown on each level, each fully loaded tray would include hundreds of arc discharge chambers 420 (see top plan view of FIG. 9 as an example).

Of course, as various sized lamps are being constructed, the sizes of bores and the number of bores, will vary to accommodate different diameter tubes. For example, a plate size may be about 15"×10"×3/8" and will include approximately 300 holes for 150 watt lamp, approximately 500 holes for a 70 watt lamp, and approximately 700 holes for a 35 watt lamp.

Spacers 414 between adjacent sintering trays 412 are of a length sufficient to provide clearance between the end cap members 210, 212 for the arc discharge chambers 420 and the respective units above and/or below. The bottom spacer elements 418 do not require as much clearance as only space for one end cap member must be provided. The spacer elements are preferably comprised of a different refractory material than the plates 412 and 416, i.e., a refractory metal such as tungsten, molybdenum, and lanthanum doped alloys thereof. However, any material substantially inert to the sintering environment would be an acceptable medium from which to construct the device.

Figure 12:
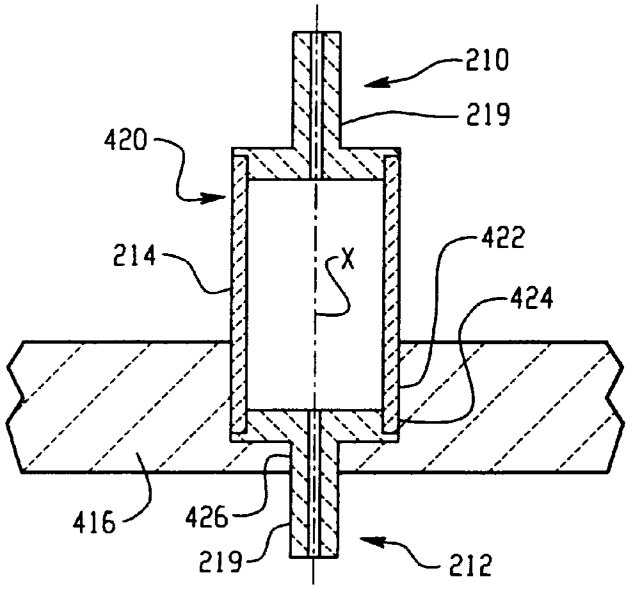
FIG. 12 is an exploded, cross-sectional view of a loaded arc chamber of FIG. 8.

As shown more clearly in FIG. 12, the sintering trays 412 are provided with a plurality of recesses 422 having a first diameter section 424 sized to accommodate the arc tube body 214 of the arc discharge chamber 420. A second narrower diameter bore 426 is provided to accommodate leg 219 of end cap 212. In this manner, each arc discharge chamber 420 is positioned such that its longitudinal axis X is vertically oriented allowing gravity to assist in mating the arc tube 214 and end caps 210 and 212. Preferably, the counter bore forming section 424 is drilled flat, such that its end surface and side walls cooperate to obtain excellent vertical alignment at the tube body 214.

Figure 10:
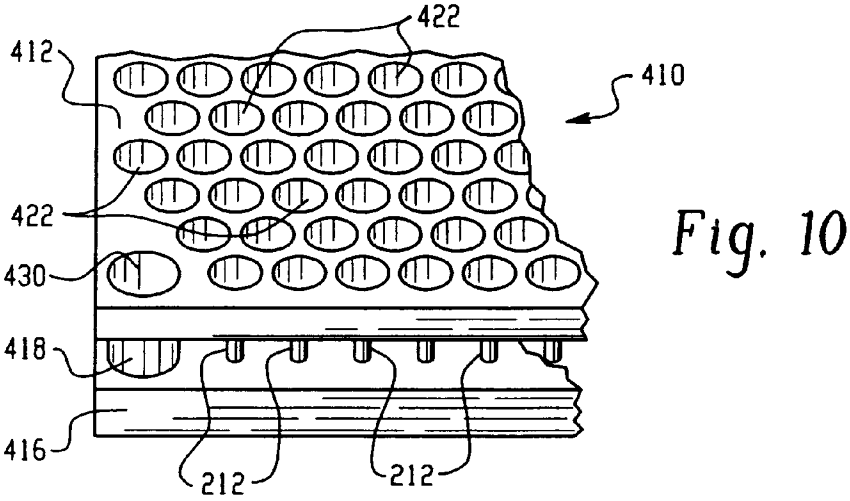
FIG. 10 represents a partial perspective view of the sintering fixture of FIG. 9 in a first stage of loading.
Figure 11:
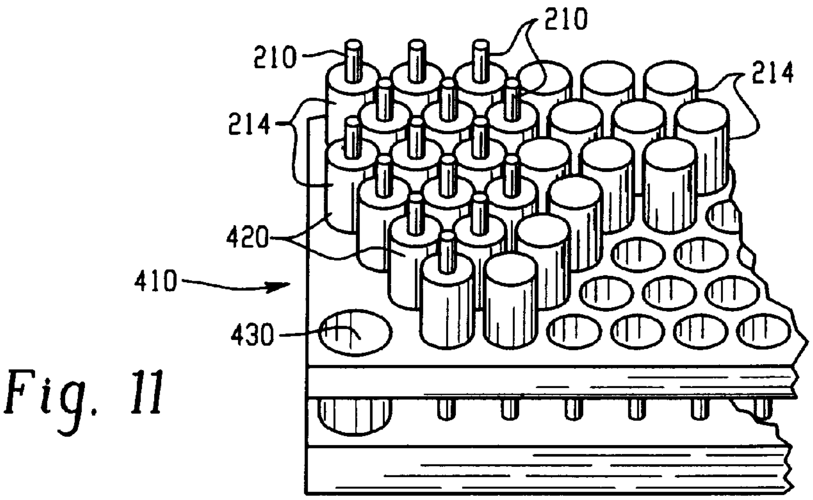
FIG. 11 represents a partial perspective view similar to FIG. 10 having progressed further in loading.

Turning now to FIGS. 10 and 11, the loading of the arc discharge chamber into fixture 410 is depicted. Referring to FIG. 10, it can be seen that a first end cap 212 has been located in the recesses 422. Turning now to FIG. 11, several of the arc discharge chambers 420 have been completed while several structures remain partly assembled. Moreover, the left hand side of the drawing includes units in which the arc tube body 214 has been mated with the first end cap 212 and an opposed second end cap 210 has been located thereon. The right hand side of the diagram shows partial assembly wherein only arc tube body 214 has been properly located. The assembly can be completed via proper positioning of spacer elements 414 into spacer recesses 430 and the stacking of additional sintering trays 412 as desired. The entire assembly can be sintered as desired in a furnace.

The inventive sintering process is suitable to a number of lamp construction shapes. In this regard, the sintering step may be carried out by heating the parts in hydrogen having a dew point of about 0 to 20° C. Typically, the temperature is increased from room temperature to about 1300° C. over a two hour period. Next, the temperature is held at about 1300° C. for about two hours. The temperature is then increased by about 100° C. per hour up to a maximum temperature of about 1800 to 1880° C. Thereafter, the temperature is held at 1800 to 1880° C. for about 3 to 10 hours. Finally, the temperature is decreased to room temperature over a period of about two hours. The resulting ceramic material comprises a densely sintered polycrystalline alumina.

The inventive process has been demonstrated to nearly double production capacity over a molybdenum tube process. In addition, an increase in production has resulted from a faster load time and a faster cool down time. Furthermore, at least a 10% reduction in defects has been evidenced. Particularly, the level of rejected arc chambers resulting from a failure to mate the end cap to chamber tube decreased by nearly 15%. Furthermore, a significant decrease from 0.09 m to 0.05 m in the standard deviation in overall length (a critical dimension) has been evidenced.

Although the invention has been described with reference to exemplary embodiments, various changes and modifications can be made without departing from the scope and spirit of the invention. For example, while the invention is depicted with several embodiments which provide a lengthwise positioning of the cap member relative to the arc chamber tube, it is to be noted that the inventive sintering method can nonetheless include the use of an adhesively secured, for example, disk member within the body of the tube. Moreover, a disk which would otherwise pass through the inner diameter of the tube can be secured via an adhesive and upon sintering the controlled shrinkage of the ceramic bodies will result in a preferably sealed arc chamber.

These and other modifications are intended to fall within the scope of the invention, as defined by the following claims:

1. A method of manufacturing a ceramic arc chamber comprising the steps of forming a first ceramic preform arc chamber component and at least a second ceramic preform arc chamber component;

first locating said first ceramic preform arc chamber component within a recess formed in a sintering fixture such that a longitudinal axis of said first ceramic preform arc chamber component is in a substantially vertical orientation;

after locating the first ceramic preform arc chamber component, mating said second ceramic preform arc chamber component with a top open end of said first ceramic preform arc chamber component; and, sintering to join said first and second ceramic preform components.

2. The method of claim 1 wherein said first ceramic preform arc chamber component comprises a generally cylindrical tube.

3. The method of claim 2 wherein said second ceramic preform arc chamber component comprises a generally disk shaped end cap.

4. The method of claim 1 wherein said ceramic is alumina.

5. The method of claim 1 wherein said fixture is comprised of a refractory metal.

6. The method of claim 5 wherein said refractory metal is selected from the group consisting of molybdenum, tungsten, lanthanum doped molybdenum, lanthanum doped tungsten and mixtures thereof.

7. The method of claim 1 wherein said fixture comprises a plate including a plurality of recesses.

8. The method of claim 7 wherein said recesses include a first upper diameter and a second lower narrower diameter section.

9. The method of claim 7 wherein a plurality of plates are stacked.

10. The method of claim 2 wherein approximately one third of a length of said cylindrical tube extends into said recess.

11. The method of claim 3 wherein said end cap includes a leg portion, a body portion and a collar.

12. A method of sintering a ceramic arc chamber comprising:

first providing a refractory metal plate including a plurality of bores, said bores including an upper section and a narrower diameter lower section;

after providing a refractory metal plate. locating a plurality of ceramic end caps having a main body portion and a leg portion in said bores wherein said leg portion passes downwardly into said narrower diameter lower section and said main body portion is retained within said upper section;

after locating said end caps in said bores, positioning a ceramic arc tube having a lower open end at least partially within said first diameter upper section, said lower open end mated to said ceramic end cap;

after positioning the ceramic arc tube within the upper section. mating a second end cap to an upper open end of said ceramic arc tube to form an arc tube preform;

and after mating the second end cap to the upper end, sintering said arc tube preform to join said components via controlled shrinkage.

13. The method of claim 12 wherein said ceramic is alumina.

14. The method of claim 12 wherein said fixture is comprised of a refractory metal.

15. The method of claim 12 wherein a plurality of spacer elements are positioned between a plurality of stacked plates.

16. The method of claim 12 wherein a shoulder formed at a transition from said upper section to said narrow diameter lower section is substantially flat.

* * * * *